(No Model.)

W. LEONARD.
ANIMAL TRAP.

No. 556,994.          Patented Mar. 24, 1896.

WITNESSES

INVENTOR
William Leonard
by E. W. Anderson
his Attorney

UNITED STATES PATENT OFFICE.

WILLIAM LEONARD, OF FORT SCOTT, KANSAS.

ANIMAL-TRAP.

SPECIFICATION forming part of Letters Patent No. 556,994, dated March 24, 1896.

Application filed January 8, 1896. Serial No. 574,722. (No model.)

*To all whom it may concern:*

Be it known that I, WILLIAM LEONARD, a citizen of the United States, and a resident of Fort Scott, in the county of Bourbon and State of Kansas, have invented certain new and useful Improvements in Animal-Traps; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
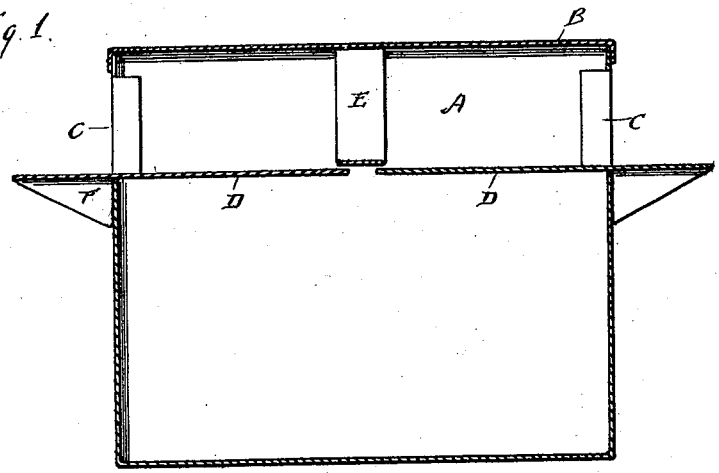
Figure 2:
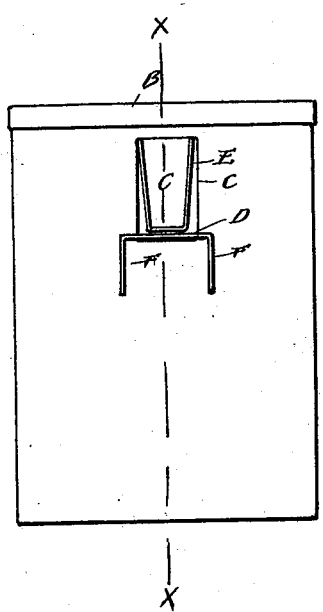
Figure 3:
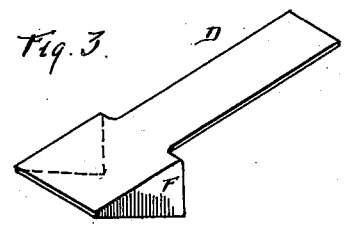

Figure 1 of the drawings is a representation of a section on line $x\,x$, Fig. 2. Fig. 2 is an end view of the trap. Fig. 3 is a perspective view of one of the trips.

The object of this invention is to provide an animal-trap of simple and effective character, particularly designed to catch rats and mice; and the invention consists in the novel construction and combination of parts, all as hereinafter described and pointed out in the appended claims.

Referring to the accompanying drawings, the letter A designates a box, which is preferably of water-tight character, and is provided with a removable cover B. Formed in each end of the said box is an elongated vertical opening C, upon the bottom edge of which is supported a trip or drop D. Said trip or drop consists of an elongated broad platform portion upon the exterior of the box and a narrower flat passway portion which extends through the opening C to a point near the center of the box. The inner ends of the two trips or drops usually approach to within a short distance of each other. Attached to the under side of the cover B is a bait-carrier E, which hangs just over the approximated ends of the two trips or drops and is accessible from each. Said carrier preferably consists of a stirrup-shaped piece, which is open upon the sides which are directly opposite the openings C, so that the bait is visible from the outside.

The platform portion of each trip or drop is provided at each side with a depending flange F, the inner vertical edge of which is designed to take an abutment against the end wall of the box and normally keep the platform portion from falling below the horizontal position. The trips or drops, it will be observed, fulcrum upon the lower edges of the openings C, and their gravity is such, by reason of the greater weight of the platform portions, as to maintain them in horizontal positions and to automatically return them to such positions after operation, so that the trap is always set. The weight of the animal as it moves onto the passway overbalances the platform portion, and the animal is precipitated into the bottom of the box.

Sufficient water may be placed in the bottom of the box to drown the animals.

Having thus described my invention, what I claim as new, and desire to secure by Letters Patent, is—

1. An animal-trap, consisting of a box or receptacle, having an opening in its end wall, a gravity trip or drop supported and fulcrumed on the lower edge of the said opening, said trip or drop having a passway portion which extends into the box and an overbalancing platform portion upon the outside thereof, said platform portion having lateral, depending stop-flanges which abut against the wall of the said box, and a bait-holder within the said box, substantially as specified.

2. An animal-trap, comprising a box or receptacle having a removable cover, and formed with a vertical opening in each end portion, a gravity trip or drop supported and fulcrumed on the lower edge of the said opening, said trips or drops having each a passway portion which projects into the box and an extended platform portion upon the outside thereof, said platform portion having a greater weight than the passway portion, and provided with lateral depending stop-flanges, and a bait-carrier attached to the cover adjacent to the approximated inner ends of the two trips or drops, substantially as specified.

In testimony whereof I affix my signature in presence of two witnesses.

WILLIAM LEONARD.

Witnesses:
J. C. AUSTIN,
GEORGE T. WILSON.